United States Patent
Petcavich et al.

(10) Patent No.: US 11,188,185 B1
(45) Date of Patent: Nov. 30, 2021

(54) INTEGRATE METAL MESH TOUCH SENSOR AND COVER LENS

(71) Applicant: FUTURETECH CAPITAL, INC., Palo Alto, CA (US)

(72) Inventors: Robert Petcavich, The Woodlands, TX (US); Michael Morrione, Jackson, CA (US)

(73) Assignee: FUTURETECH CAPITAL, INC., Palo Alto, CA (US)

( * ) Notice: Subject to any disclaimer, the term of this patent is extended or adjusted under 35 U.S.C. 154(b) by 2 days.

(21) Appl. No.: 16/883,310

(22) Filed: May 26, 2020

(51) Int. Cl.
G06F 3/041 (2006.01)
G06F 3/047 (2006.01)
G06F 3/044 (2006.01)

(52) U.S. Cl.
CPC ............ *G06F 3/047* (2013.01); *G06F 3/0412* (2013.01); *G06F 3/0446* (2019.05); *G06F 2203/04103* (2013.01)

(58) Field of Classification Search
CPC ........ G06F 3/047; G06F 3/0446; G06F 3/044; G06F 3/0412; G06F 3/041; G06F 3/045; G06F 2203/04103
See application file for complete search history.

(56) References Cited

U.S. PATENT DOCUMENTS

| | | | |
|---|---|---|---|
| 9,335,873 B2 | 5/2016 | Cowd et al. | |
| 2013/0105440 A1* | 5/2013 | Lu | G03F 7/027 216/41 |
| 2016/0291478 A1* | 10/2016 | Petcavich | G03F 7/162 |
| 2018/0032185 A1* | 2/2018 | Zeng | H02J 7/35 |
| 2019/0200459 A1* | 6/2019 | Yen | C23C 18/1605 |
| 2020/0371640 A1* | 11/2020 | Tsai | G06F 3/0443 |

* cited by examiner

*Primary Examiner* — Pegeman Karimi
(74) *Attorney, Agent, or Firm* — Womble Bond Dickinson (US) LLP; Joseph Bach, Esq.

(57) ABSTRACT

Touchscreen, comprising: a display device and a touch sensor adhered to the display device via optically clear adhesive; wherein the touch sensor comprises: a transparent substrate; a layer of catalytic photoresist patterns of a catalytic photoresist composition, the catalytic photoresist composition including a photoresist and catalytic nanoparticles; a metal conductive layer with conductive patterns over the layer of catalytic photoresist patterns; a metal passivation layer over the metal layer; and a transparent protective layer having on a cross-linked structure over the metal passivation layer.

20 Claims, 4 Drawing Sheets

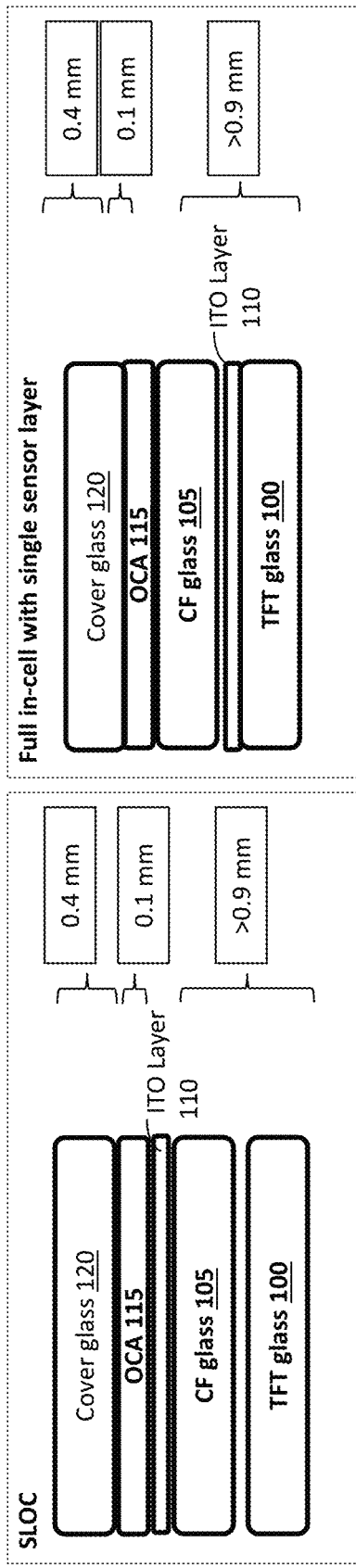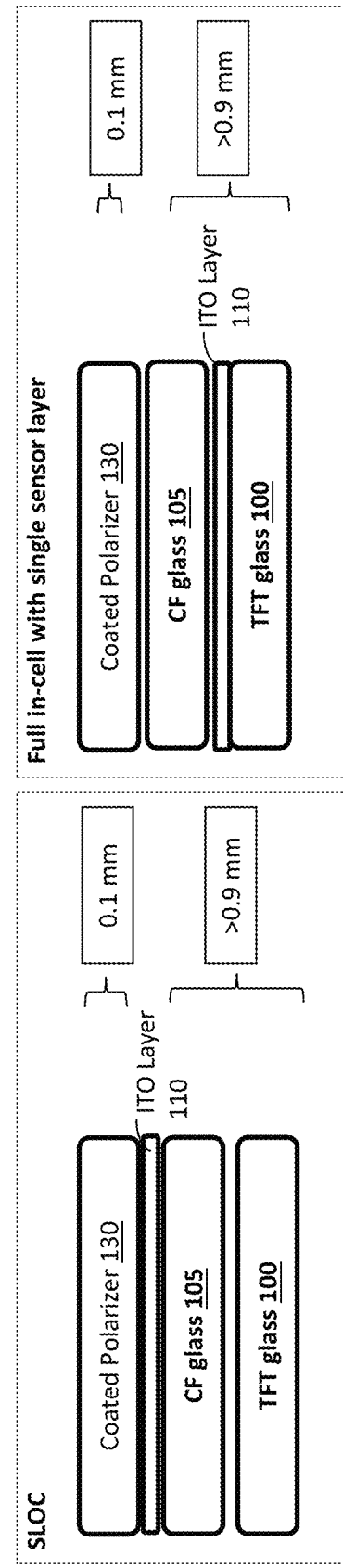

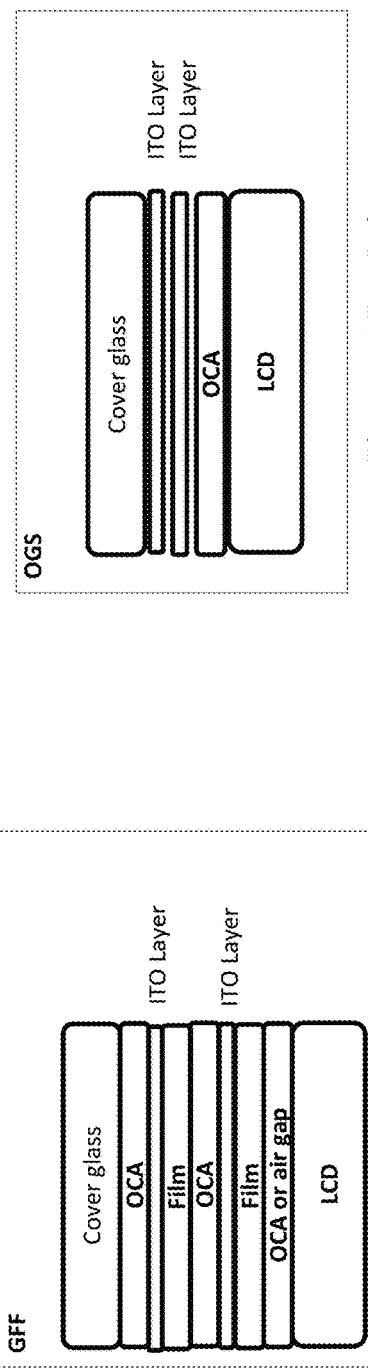
Figure 1E – Prior Art
Figure 1F – Prior Art
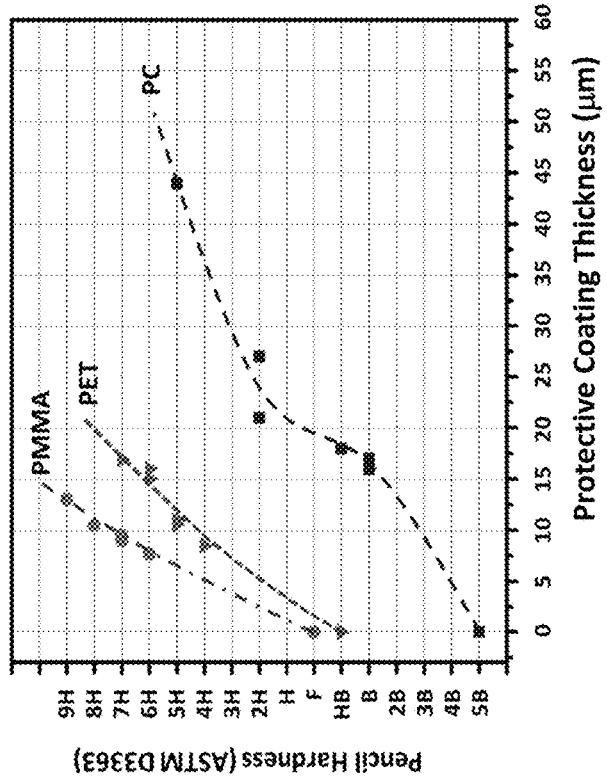
Figure 4
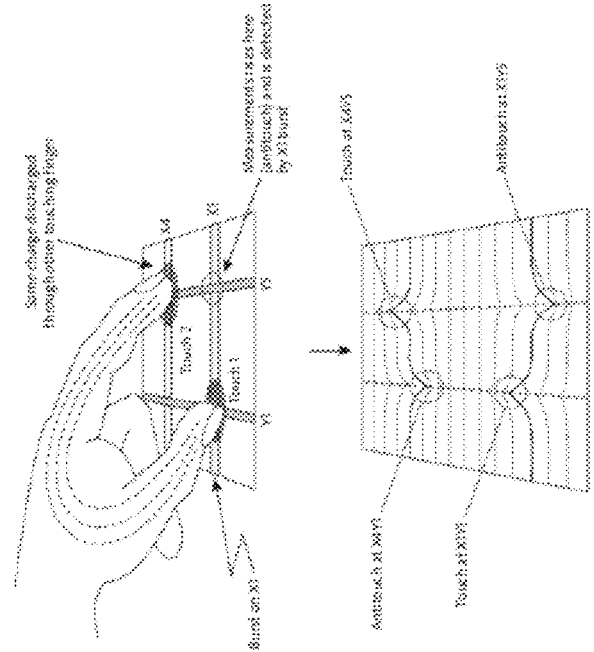
Figure 2 – Prior Art

INTEGRATE METAL MESH TOUCH SENSOR AND COVER LENS

TECHNICAL FIELD

Embodiments of the present disclosure relate generally to touch screens. More particularly, embodiments of the disclosure relate to touch sensors with metallic micro-mesh integrated with a protective cover lens.

BACKGROUND

A touch screen enabled system allows a user to control various aspects of the system by finger touch or stylus motion on the screen. A user may interact directly with one or more objects depicted on a display device by fingers or stylus that are sensed by the touch sensor. The touch sensor typically includes a conductive pattern disposed on a substrate configured to sense the exact position of the finger or stylus. Touch screens are commonly used in consumer, commercial, and industrial systems.

With the advent of tablets and ultra-portable laptops, additional stringent requirements have been placed on touchscreens, which implies additional requirements for the touch sensor. Notably, weight and overall thickness are important parameters to enable the portability of these devices. Moreover, due to the physical interaction of the user with the surface of the touchscreen, the front surface of the touchscreen must protect against scratches and abrasion. Although these requirements are more stringent for tablets than for laptop, still a touchscreen of a laptop must meet certain criteria for resisting scratches and abrasion.

Typical hardness for the notebook front surface is 6H pencil hardness as measured using the standard test method ASTM D3363: Standard Test Method for Film Hardness by Pencil Test. Abrasion resistance requirements can vary regarding abrasive material (felt, steel wool, denim), the number of cycles and the load applied. The haze and transmission of a surface are measured before and after the required number of cycles.

Another issue is matching the touch sensor resolution to the display's resolution. High end notebook computers now have displays that provide Full HD resolution (FHD=1920×1080 pixels) and UHD resolution (4K=3840×2160 and 8K=7680×4320 pixels). Therefore, a comparable increase in the touch sensor resolution must be implemented to match the resolution of the displays.

High end notebook computers without touch screens have thin display packages. This is sometimes achieved by eliminating the protective cover glass over the display. Instead, the outer polarizer of the display is coated with protective film that increases the hardness of the polarizer film to 6H. Eliminating the cover glass also achieves the other requirement of reducing the overall weight of the notebook computer. Adding high resolution touch screen capability should not add additional thickness or weight. Current touch screen technologies do not provide both high resolution touch sensing and reduced weight and thickness requirements.

The conductive pattern of touch screens has been traditionally made from transparent conductive material, such as indium tin oxide (ITO). FIGS. 1A and 1B illustrates examples of the stack for a touchscreen having a cover glass and an ITO-based touch sensor. FIG. 1A illustrates a stack referred to as on-cell single layer (SLOC) and FIG. 1B illustrates a stack referred to as in-cell single layer. As can be seen, the TFT glass 100 is at the base and the cover glass 120 is at the top of the stack. In FIG. 1A the ITO layer (touch sensor) is provided above the color filter glass 105 (i.e., on-cell), while in FIG. 1B the ITO layer is provide below the CF glass 105, i.e., in-cell. The optically clear adhesive 115 may or may not be used between any of the shown layers.

As noted, some manufacturers opted to remove the cover glass. FIGS. 1C and 1D illustrate two embodiments corresponding to the stacks of FIGS. 1A and 1B, but without the cover glass. Instead, a polarizer layer is provided with a hard coating to serve as the protective layer.

In the embodiments of FIGS. 1A-1D, the single layer ITO pattern limits the touch sensor resolution. Moreover, the single layer ITO pattern closely integrated with LCD limits noise rejection in the touch sensor. Consequently, the resulting lower signal-to-noise ratio reduces multi-finger and moisture rejection touch performance. One method to increase resolution of the touch sensor is to use two ITO layers. Examples are illustrated in FIGS. 1E and 1F, wherein FIG. 1E illustrates a stack referred to as glass-film-film (GFF), while FIG. 1F illustrates a stack referred to as One Glass Solution (OGS). In the stack of FIG. 1E, the touch sensor is comprised of two plastic films with patterned ITO and joined with optical clear adhesive (OCA). While being one of the most conventional structures for projected capacitive sensors, GFF has the disadvantage of being the thickest touch sensor and the requirement for the relatively heavy cover glass to protect the soft stack of two plastic films and optically clear adhesive. OGS, on the other hand, eliminates the multiple film lamination steps required for GFF sensors; however, it requires thicker cover glass, which is also heavier.

Another issue with current touch sensor technologies having no or thin cover lens are electrical performance issues known as retransmission, or sometimes referred to as "ghosting". Retransmission occurs most often when the computing device is in a floating electrical state, such as when it is unplugged and sitting on a desktop. When the user applies two or more touches to the screen, the pulses from one sensor line transmit a small amount of charge through a user's fingers and depositing it onto another electrode as shown in FIG. 2. This extra charge results in an effect known as "anti-touch" and can be seen as a large negative touch signal.

Touch screen controllers can differentiate between actual touch location and retransmission signal by using multiple drive and sense modes during each measurement cycle. For example, the controller can perform the measurement in a mutual capacitance mode, take a second measurement in self-capacitance mode, and a third measurement by applying reverse voltage driving to the sense lines and then compare the results from the three measurements. The number of measurements during each controller touch measurement cycle is dependent on the touch sensor resolution and the resistance of the sensor conductor material. See, also, U.S. Pat. No. 9,335,873.

In the case of no cover lens or cover lens thinner than 0.5 mm, ITO conductor-based touch sensors have higher resistance and will limit the resolution of the touch sensor, especially in performing multiple measurements to reject retransmission touch effects. Therefore, a new stack design is required that will provide thinner, lighter and high resolution touchscreen.

SUMMARY

The following presents a simplified summary of one or more aspects in order to provide a basic understanding of such aspects. This summary is not an extensive overview of all contemplated aspects and is intended to neither identify key or critical elements of all aspects nor delineate the scope of any or all aspects. Its sole purpose is to present some concepts of one or more aspects in a simplified form as a prelude to the more detailed description that is presented later.

Disclosed herein is a method for manufacturing a touch sensor with an integrated protective layer over the conductive metallic micro-mesh that can serve as the cover lens for the touch screen. The method provides a sensor that can be integrated with a display screen having thin and light form factor but be resistive to scratches and abrasion.

In disclosed aspects, an integrated cover lens is formed of a scratch resistant, protective coating based on a cross-linked structure that does not originate from a polymer chain. Instead, the coating may be comprised of monomers that react simultaneously at different joint points to create a cross linked, three-dimensional polymer structure that exhibits very high cross-linked densities, and hence, scratch resistant features. The very high cross-linked density of the protective coating provides the required abrasion resistance, chemical resistance and environment sealing.

In an aspect of the disclosure, a method of manufacturing a touch sensor with a protective coating is provided. The method comprises applying catalytic photoresist composition onto a transparent substrate of the touch sensor; photo patterning the catalytic photoresist composition to have a layer of catalytic photoresist pattern; plating a metal layer on the layer of catalytic photoresist pattern thereby forming the conductive micro-mesh; applying a metal passivation layer over the metal layer; applying a clear protective coating comprising mono or multifunctional acrylic monomers or oligomers over the metal passivation layer over the metal passivation layer; and curing the protective coating to generate cross-linked three-dimensional polymer structure.

In an aspect of the disclosure, a touch sensor with a protective coating is disclosed. The touch sensor comprises a transparent substrate, a layer of catalytic photoresist patterns made of a catalytic photoresist composition, the catalytic photoresist composition including a photoresist and catalytic nanoparticles; a metal conductive layer with conductive patterns forming a conductive mesh over the layer of catalytic photoresist patterns; a metal passivation layer over the metal layer; and a clear protective coating having a cross-linked structure and formed over the metal passivation layer.

In further aspects of the disclosure, a touch screen is provided having touch sensor with a protective coating over the metallic conductive micro-mesh. The touch screen comprises a display layer, e.g., an LCD, an OLED, etc., and a touch sensor adhered to the display layer with an optically clear adhesive. The touch sensor comprises a transparent substrate, and a layer of catalytic photoresist patterns of a catalytic photoresist composition, the catalytic photoresist composition including a photoresist and catalytic nanoparticles. The touch sensor further comprises a metal conductive layer with conductive patterns on the layer of catalytic photoresist patterns. The touch sensor further comprises a clear protective coating having a cross-linked structure and formed over the metal layer.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

Embodiments of the disclosure are illustrated by way of example and not limitation in the figures of the accompanying drawings in which like references indicate similar elements.

FIG. 1A-1F illustrate cross section of various stacks of touch screens according to the prior art.

FIG. 2 is a schematic illustrating the retransmission effect.

FIG. 4 is a is a plot of pencil hardness tests for different thicknesses of a protective coating according to disclosed embodiments.

DETAILED DESCRIPTION

Figure 3:
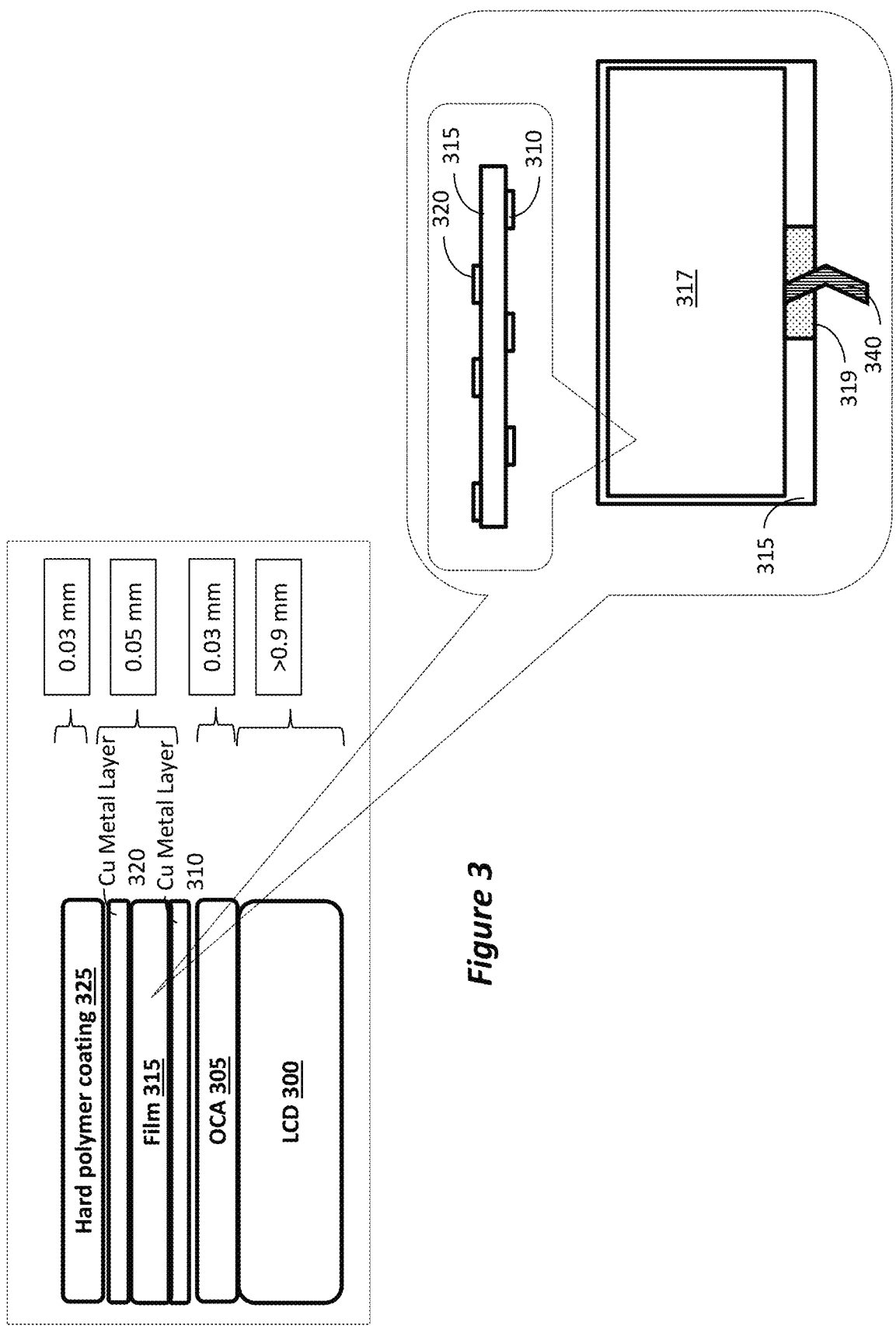
FIG. 3 is a block diagrams illustrating an example of a cross-section view of an integrated touch sensor and protective lens according to some embodiments.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

Embodiments of the inventive integrated touch sensor with cover lens will now be described with reference to the drawings. Different embodiments or their combinations may be used for different applications or to achieve different benefits. Depending on the outcome sought to be achieved, different features disclosed herein may be utilized partially or to their fullest, alone or in combination with other features, balancing advantages with requirements and constraints. Therefore, certain benefits will be highlighted with reference to different embodiments but are not limited to the disclosed embodiments. That is, the features disclosed herein are not limited to the embodiment within which they are described but may be "mixed and matched" with other features and incorporated in other embodiments.

According to disclosed embodiments, the touch sensor comprised of arrays of copper conductors that are patterned to form the transmit (Tx) and read (Rx) channels of a touch sensor. The patterned copper conductors have a width of up to 5-micron and are patterned on both sides of an insulating film, forming micro meshes. The pattern on one side forms the Tx channel and the pattern on the other side forms the Rx channel, together forming a mutual capacitance touch sensor.

In disclosed embodiments the integrated cover lens comprises a scratch resistant, protective coating based on a cross-linked structure that does not originate from a polymer chain. Instead, the coating may be comprised of monomers that react simultaneously at different joint points to create a cross linked, three-dimensional polymer structure that exhibits very high cross-linked densities, and hence, scratch resistant features. Specifically, the transparent, scratch resistant coating may comprise mono or/and multifunctional acrylic monomers and/or oligomers. This coating may be applied over a touch sensor screen thereby protecting the screen from environmental conditions, chemicals, wear, abrasion, scratches, and thus eliminating the need to use an extra cover glass.

In disclosed embodiments the protective coating is 15-25 microns thick and is applied using slot die or gravure coating method. In preferred embodiments the coating is exposed to UV radiation to achieve a very high cross-linked density. During the coating step, the touch sensor bonding pad is masked to prevent the protective coating from being applied to the bond pad and interfering with bonding the flat printed cable. The coating should be uniformly applied free of streaks, bubbles, particles and thickness variation in order to achieve a high optical quality finish.

The metal mesh touch sensor with integrated cover lens may be bonded to the display top surface using a pressure sensitive optically clear adhesive (OCA). The OCA layer should preferably be 5-40 microns thick. A cross section of the assembly according to an embodiment is shown in FIG. 3.

In the embodiment of FIG. 3, a metal-mesh touch sensor is fabricated by forming one metal mesh 310 on one side of a dielectric transparent film 315, and another metal mesh 320 on the opposite surface of the transparent film 315. The metal mesh may be formed of copper or copper alloy. In certain embodiments, the transparent film/substrate 315 may be polyethylene terephthalate ("PET"), polyethylene naphthalate ("PEN"), cellulose acetate ("TAC"), cycloaliphatic hydrocarbons ("COP"), polymethylmethacrylates ("PMMA"), polyimide ("PI"), bi-axially-oriented polypropylene ("BOPP"), polyester, polycarbonate, glass, copolymers, blends, or combinations thereof. In other embodiments, transparent substrate 315 may be any other transparent material suitable for use as a touch sensor substrate such as eagle glass, flexible glass, and quartz. The composition of transparent substrate 315 may vary based on an application or design.

In the embodiment of FIG. 3, a hard polymer coating 325 is applied directly over the wire mesh 320, over the top surface of the transparent substrate 315. The callout in FIG. 3 illustrates a cross section of a small section of the touch sensor and a top view of a generic layout of a touch sensor. As noted, generally, the touch sensor comprises the transparent substrate 315, which may be larger than the viewable area of the display device. The transparent substrate 315 includes a touch sensing area 317, upon which a top conductive mesh 320 and a bottom conductive mesh 310 are formed. The top mesh 320 and the bottom mesh 310 form a plurality of addressable intersections. The position of the finger or stylus touch on the sensor is sensed at each of the intersections and the signal is transmitted to contacts at the bond pads area 319. A flex cable 340 is attached to the contacts of the bond pad area to transmit the signal to the processor of the touch screen. During fabrication of the hard polymer coating 325 the bond pad area 319 is masked so that no hard coat is formed over the bond pad area 319.

The resulting embodiment meets the requirements for high end notebook computer requirements. The integrated cover lens eliminates the additional weight associated with a separate 0.5 mm thick cover glass. The overall thickness of an embodiment of FIG. 3 is 125 microns or less and will fit into the form factor required by high end notebooks. High resolution touch sensor to match the FHD and UHD display can be achieved with the copper metal mesh touch sensor. The touch sensor metallic conductor's low electrical resistance allows the touch controller to run multiple read/write modes within a touch measurement cycle to detect and eliminate large retransmission signals that will occur with the thin, integrated protective coating cover lens.

The very high cross-linked density of the protective coating will provide the required abrasion resistance, chemical resistance and environment sealing. Achieving the scratch resistance requirements of 6H or higher requires that the protective coating, the touch sensor PET film and the OCA layer work in concert. Scratching is the application of a compressive force by narrow (sharp) material that has a higher elastic deformation property compared to the material the force is being applied to. The protective coating, PET film and OCA are all relatively thin layers of polymer base materials and will have low elastic deformation properties relative to metals, ceramics and graphite that might make up the sharp object applying the compressive force. The protective coating will have a higher elastic deformation property compared to the PET film or the OCA. The protective coating will initially resist the compressive force, however at some point the underlying PET film and OCA will begin to deform. The resultant scratch will be a combination of plastic deformation of the underlying PET and OCA film and the protective coating cracking given the high cross-linking and the deformation of the underlying PET film and OCA.

In disclosed embodiments improved results may be achieved by increasing the thickness of the protective coating and reducing the thickness of the PET film and OCA layers. Examples for the respective thicknesses are provided in FIG. 3. FIG. 4 shows the measured hardness as a function of the protective coating thickness on different polymer substrates of different thicknesses. The thinner PET film and OCA will undergo less elastic deformation and provide more support for the harder protective film. The result is a higher measured hardness of the top surface of the protective coating. In disclosed embodiments, it is preferred to keep the thickness of the PET film at from 30 to 50 microns and the OCA thickness at from 5 to 40 microns. The protective coating layer thickness is formed to from 15 to 25 microns. Forming the protective coating within the preferred thickness range provides improved uniformity of coating and the material's properties of transmission and stresses in the UV cured coating.

Figure 5:
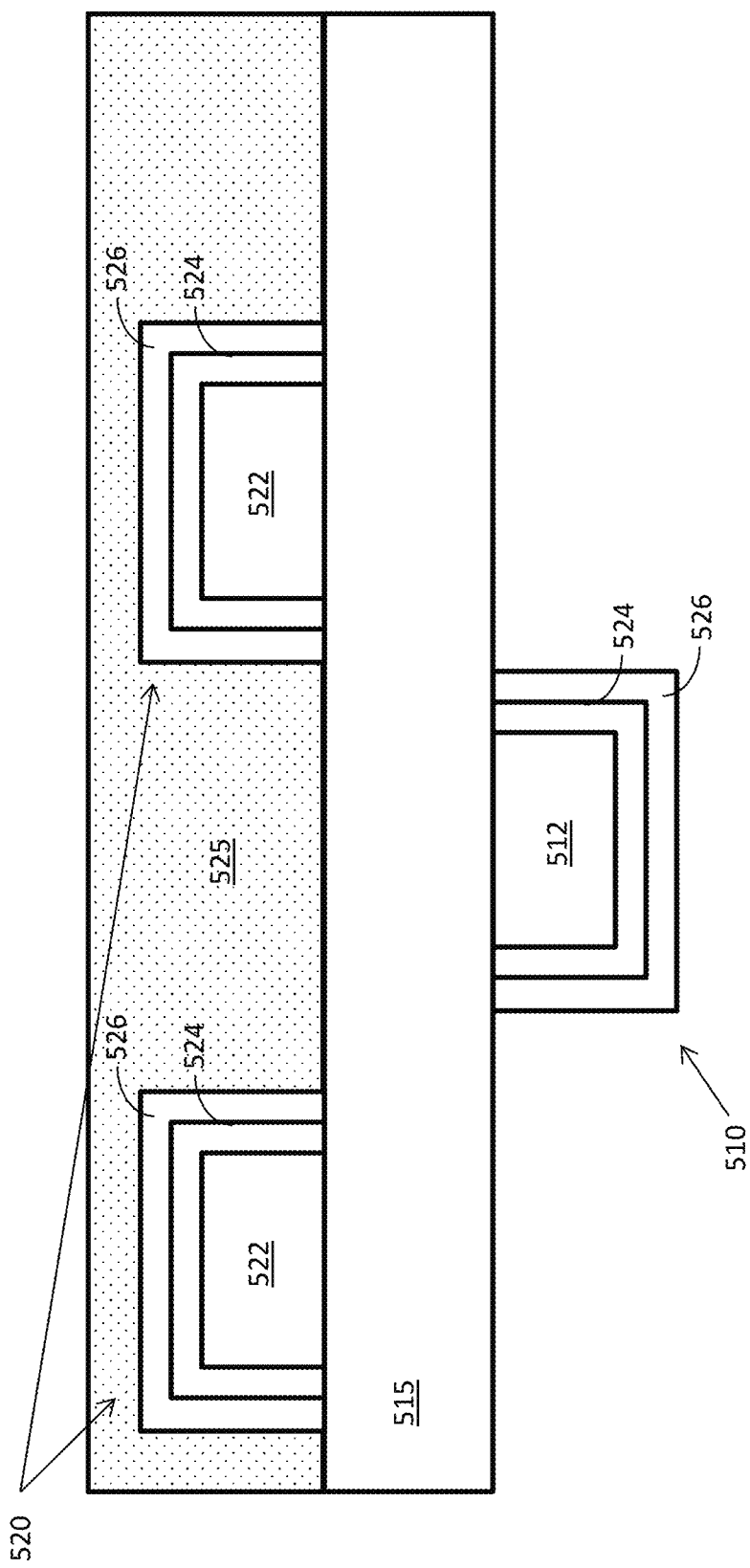
FIG. 5 is a block diagram illustrating an example of a cross-section view of an integrated touch sensor and protective lens according to some embodiments.

FIG. 5 illustrates a cross section of a touch sensor with integrated protective cover according to an embodiment. The sensor of FIG. 5 may be fabricated by the following process. A catalytic photoresist is deposited and patterned over the transparent substrate 515 to thereby form patterns 512 and 522. With respect to the transparent substrate 515 (and other references to transparent or clear in this disclosure), "transparent" or "clear" may refer to being capable of transmitting a substantial portion of visible light through the medium which is suitable for a given touch sensor application or design. In some touch sensor applications, "transparent" may refer to transmittance of at least 85% of incident visible light through the medium. However, other transmittance values may be desirable for other touch sensor applications or designs.

The catalytic photoresist composition is applied to the optically transparent substrate 515 and is subsequently photo exposed, developed, and etched, to form the grid design of the micro mesh. The catalytic photoresist composition may be formed by dispersing catalytic nanoparticles, e.g., silver nanoparticles, into a photoresist. The catalytic photoresist composition may include a positive or negative photoresist component and a catalyst component that may include catalytic nanoparticles. In some embodiments, the negative photoresist may be advantageous. In some embodiments, the negative photoresist may be acrylic phenolic polymer. In other embodiments, the negative photoresist may be acrylic, epoxy, urethane, or combinations of one or more of the aforementioned compositions. The negative photoresist may vary in accordance with some embodiments of the present disclosure.

The function of the catalytic photoresist is to enable the electroless deposition of copper or copper alloy, thus forming the metallic micro-mesh. The catalytic nanoparticles are embedded in the photoresist in order to form nucleation sites for the electroless deposition of copper. By having catalyst nanoparticles in the photoresist composition, and then patterning the photoresist, the catalyst nanoparticles will form nucleation sites only over the developed photoresist, so as to form the mesh design. Notably, contrary to other semiconductor manufacturing, where the photoresist is used for the delineation of the circuit feature and is thereafter removed, in touch sensors having electroless copper lines the catalytic photoresist remains part of the finished touch sensor.

In certain embodiments, the catalytic photoresist composition may include negative photoresist component content in a range between approximately 30 percent and approximately 95 percent by weight and catalyst component content in a range between approximately 5 percent and approximately 70 percent by weight. In other embodiments, the catalytic photoresist composition may include negative photoresist component content in a range between approximately 50 percent and approximately 70 percent by weight and catalyst component content in a range between approximately 30 percent and approximately 50 percent by weight. For example, the photoresist may be an epoxy-based negative resist SU8. In some embodiments, the size of the catalytic nanoparticles may range from 5 to 250 nanometers, for example, the catalytic nanoparticles may have a size of 15-25 nanometers.

The catalytic nanoparticle composition may be applied to the substrate 515 by a number of techniques such as gravure, reverse gravure, slot die, spray, flexographic, or Meyer rod techniques. The catalytic nanoparticle composition after drying and baking may range in thickness from 1 to 100 microns. For example, the catalytic nanoparticle composition may have a thickness of 5 to 25 microns. After application to the substrate 515, the multilayer stack may be exposed to UV radiation.

The UV radiation from an external source may be applied to form the mesh pattern design. The UV radiation incident on a photomask (not shown) may pass through a negative image of a conductive pattern onto the catalytic photoresist composition disposed on the transparent substrate 515. This transfers the pattern design from the mask to the photoresist.

After the UV radiation from the external source is applied to the transparent substrate 515, a developer may be applied to the catalytic photoresist composition. In some embodiments, the developer may include a water-based alkaline solution. In other embodiments, the developer may include an organic solvent such as, for example, Carbitol™, or Dowanol™. The composition of the developer may vary with the catalytic photoresist composition in accordance with some embodiments of the present disclosure.

The developer may loosen or remove unexposed portions of the catalytic photoresists composition, leaving a catalytic photoresist image 522 and 512 of the conductive pattern on the transparent substrate 515. In certain embodiments, an optional hard bake may be performed on the transparent substrate 515 after development. Hard-bake typically includes heating the transparent substrate 515 to a sufficient temperature for a sufficient amount of time to stabilize and harden the developed catalytic photoresist composition prior to stripping. The temperature and the amount of time required to hard-bake may vary based on the composition and the applied thickness of the catalytic photoresist composition. After development, any remaining catalytic photoresist composition not exposed to UV radiation is stripped, leaving catalytic photoresist patterns in the image of the pattern on the transparent substrate 515.

As illustrated in FIG. 5, a layer of metal 524 may be plated on the remaining catalytic photoresist composition 512 and 522, thereby forming the conductive patterns of the conductive mesh on the transparent substrate. In some embodiments, an electroless plating process may be used to electroless plate a first metal 524 on the catalytic photoresist composition patterns disposed on the substrate. In other embodiments, an immersion bath process may be used to immersion plate a first metal 524 on the catalytic photoresist composition. Other methods of disposing metal on the catalytic photoresist composition pattern may be used as well, but in the embodiments of FIG. 5 the benefit of having catalyst embedded in the photoresist are taken advantage of. The conductive lines 524 form part of a conductive metal mesh for the sensor. When a width of the conductive line 524 is small, e.g., in microns, the conductive patterns result in a conductive micro-mesh for the sensor, which is too thin to be visible to the user.

In some embodiments, the first metal 524 may be copper. In other embodiments, the first metal may be copper alloy. Other metals or metal alloys may be used as well, especially metals that interact with the catalyst nanoparticles. In certain embodiments, more than one metal layers may be disposed on the patterned catalytic photoresist composition.

In certain embodiments, an opaque metal passivation layer 526, for example, palladium, or other opaque protective coating, may be applied, e.g., by electroless plating, over the metal 524 to protect the metal 524 from corrosion and other environmental failure. Additionally, the metal passivation layer 526 may impart a dull gray black color that reduces or minimizes reflections from the metal, e.g., copper, plated micro-mesh features. The metal lines are rather thin, in the range of 200-400 nanometers.

A protective coating layer 525 is then formed on the front surface of the touch sensor. In some specific examples, the protective coating is formed by preparing a protective coating solution of 70%-80% monofunctional acrylic oligomers, 20%-30% solvent, and 1%-6% of photoinitiators. Examples of solvents that may be used in the coating include but are not limited to ketone-type solvents such as acetone, methyl ethyl ketone, and iso-butyl ethyl ketone, as well as alcohol-type solvents such as ethoxy ethanol and methoxyethanol.

Examples of potential functional group monomers that can be used may include propoxylated trimethylolpropane tri(meth)acrylate, highly propoxylated glyceryl triacrylate, trimethylolpropane triacrylate, high purity trimethylolpropane triacrylate, low viscosity trimethylolpropane triacrylate, pentaerythritol triacrylate, propoxylated trimethylolpropane triacrylate, trifunctional acrylate ester, pentaerythritol tetraacrylate, di-trimethylolpropane tetraacrylate, dipentaerythritol pentaacrylate, ethoxylated pentaerythritol tetraacrylate, multifunctional aliphatic urethane or oligomer, multifunctional aromatic urethane or oligomer, and pentaacrylate ester.

Additionally, in order to have proper viscosity for the coating process and to control the stress of the cross-linked polymer, lower functionalized monomers can also be introduced. Examples of potential lower functionalized monomers which may be used include polyethylene glycol diacrylate, dipropylene glycol diacrylate, propoxylated neopentylglycol diacrylate, 1,3-butylene glycol dimethacrylate, neopentylglycol dimethacrylate, 1.6 hexanediol dimethacrylate, 1,4-butanediol dimethacrylate, and diethylene glycol dimethacrylate.

The photo-initiators may be, for example, acetophenone, anisoin, anthraquinone, anthraquinone-2-sulfonic acid, Sodium salt monohydrate, (benzene) tricarbonylchromium, benzil, benzoin, benzoin ethyl ether, benzoin isobutyl ether, benzoin methyl ether, benzophenone, benzophenone/1-hydroxycyclohexyl phenylketone, 50/50 blend, 3,3,4,4'-benzophenonetetracarboxylic dianhydride, 4-benzoylbiphenyl, 2-benzyl-2-(dimethylamino)-4'-morpholinobutyrophenone, 4,4'-bis(diethylamino)benzophenone, 4,4'-bis(dimethylamino)benzophenone, camphorquinone, 2-chlorothioxanthen-9-one, (cumene)cyclopentadienyliron(ii) hexafluorophosphate, dibenzo Suberenone, 2.2-diethoxyacetophenone, 4,4'-dihydroxybenzophenone, 2,2-dimethoxy-2-phenylacetophenone, 4-(dimethylamino)benzophenone, 4,4'-dimethylbenzil, 2.5-dimethylbenzophenone, 3,4-dimethylbenzophenone, diphenyl(2,4,6-trimethylbenzoyl)phosphine oxide/2-hydroxy-2-methylpropiophenone, 50/50 blend, 4-ethoxyacetophenone, 2,4,6-trimethylbenzoyldiphenylphophine oxide, phenyl bis(2,4,6-trimethyl benzoyl)phosphine oxide, 2-ethylanthraquinone, ferrocene, 3'-hydroxyacetophenone, 4'-hydroxyacetophenone, 3-hydroxybenzophenone, 4-hydroxybenzophenone, 1-hydroxycyclohexyl phenylketone, 2-hydroxy-2-methylpropiophenone, 2-methylbenzophenone, 3-methylbenzophenone, methybenzoylformate, 2-methyl-4-(methylthio)-2-morpholinopropiophenone, phenanthrenequinone, 4'-phenoxyacetophenone, thioxanthen-9-one, triarylsulfonium hexafluoroantimonate salts, mixed, 50% in propylene carbonate, and triarylsulfoniumhexafluorophosphate salts, mixed, 50% in propylene carbonate.

In order to achieve the higher cross link density and hardness, the coating should UV radiation cured. The UV light source should have a wavelength of about 280 to 480 nm, and the radiation should be applied at intensity in the range of 0.5 to 20.0 J/cm. This radiation intensity provides the high density cross-linking required to achieve the desired hardness for 6H pencil hardness as measured using the standard test method ASTM D3363.

Since the protective coating remains a part of the touch screen, it must be transparent and have a high optical quality and must be devoid of pinholes. Therefore, in disclosed embodiments a process of filtering and degassing the protective coating solution prior to coating is performed, so as to eliminate particles and pinholes. In some embodiments, degas filters are used to filter the solution and remove gas from the liquid. An example of degas filter is Liqui-Cel™ available from 3M company. Such filters utilize hollow fiber membrane technology, which allow gas but not liquid to pass through.

In disclosed embodiments the solution is applied to the touch sensor using either gravure or slot die coating methods, which provide a smooth surface finish and good optical properties. The coating in disclosed examples extend over all metal conductor traces and out to the edge of the substrate film, but not including the bond pad area. A high level of cross-linking density should be used to maximize the cured coating hardness. Cross linking can be controlled using the percentage amount of monofunctional acrylic oligomer in the solution and by properly setting the parameters of the thermal or irradiation curing. For example, the temperature and bake time can be set for thermal curing or the light output of the UV lamp and the dwell time the coating is exposed to the UV light source can be set for irradiation curing.

The coating thickness should be about 15-25 microns thick. In example embodiments, the touch sensor is produced in a roll-to-roll fabrication method, in which case gravure or slot die coating method is beneficial method for the coating, but it may also cover the bonding pads. Therefore, masking may be used to prevent the application of the coating over the bond pad area.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

Incidentally, in this disclosure the term top or upper refers to the side facing the user when the touch screen is in use, while bottom or lower indicate the direction away from the user.

While the present disclosure has been disclosed in example embodiments, those of ordinary skill in the art will recognize and appreciate that many additions, deletions and modifications to the disclosed embodiments and their variations may be implemented without departing from the scope of the disclosure. A wide range of variations to those implementations and embodiments described herein are possible. Components and/or features may be added, removed, rearranged, or combinations thereof. Similarly, method steps may be added, removed, and/or reordered.

Likewise, various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein but are to be accorded the widest scope consistent with this disclosure, the principles and the novel features disclosed herein.

Accordingly, reference herein to a singular item includes the possibility that a plurality of the same item may be present. More specifically, as used herein and in the appended claims, the singular forms "a," "an," "said," and "the" include plural referents unless specifically stated otherwise. In other words, use of the articles allow for "at least one" of the subject item in the description above as well as the claims below.

Additionally, as used herein, a phrase referring to "at least one of" a list of items refers to any combination of those items, including single members. As an example, "at least one of: a, b, or c" is intended to cover: a, b, c, a-b, a-c, b-c, and a-b-c.

Certain features that are described in this specification in the context of separate embodiments also can be implemented in combination in a single embodiment. Conversely, various features that are described in the context of a single embodiment also can be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations may be described as occurring in a particular order, this should not be understood as requiring that such operations be performed in the particular order described or in sequential order, or that all described operations be performed, to achieve desirable results. Further, other operations that are not disclosed can be incorporated in the processes that are described herein. For example, one or more additional operations can be performed before, after, simultaneously, or between any of the disclosed operations. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single product or packaged into multiple products. Additionally, other embodiments are within the scope of the following claims. In some cases, the actions recited in the claims can be performed in a different order and still achieve desirable results.

Terminology used herein is for the purpose of describing particular embodiments only and is not intended to be limiting of the invention. For example, as used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "/".

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise. Although the terms "first" and "second" may be used herein to describe various features/elements (including steps), these features/elements should not be limited by these terms, unless the context indicates otherwise. These terms may be used to distinguish one feature/element from another feature/element. Thus, a first feature/element discussed below could be termed a second feature/element, and similarly, a second feature/element discussed below could be termed a first feature/element without departing from the teachings of the present invention.

What is claimed is:

1. A method of manufacturing a touch sensor with a conductive micro-mesh comprising:
    applying the catalytic photoresist composition onto a transparent substrate of the touch sensor;
    photo patterning the catalytic photoresist composition to have a layer of catalytic photoresist pattern;
    plating a metal layer on the layer of catalytic photoresist pattern thereby forming the conductive micro-mesh;
    applying a metal passivation layer over the metal layer;
    applying a clear protective coating comprising mono or multifunctional acrylic monomers or oligomers over the metal passivation layer; and
    curing the protective coating to generate cross-linked three-dimensional polymer structure.

2. The method of claim 1, wherein applying a protective coating comprises applying a solution comprising: 70%-80% monofunctional acrylic oligomers, 20%-30% solvent, and 1-6% photoinitiators.

3. The method of claim 2, wherein the curing is performed by irradiating the protective coating with UV radiation at a wavelength of from 280 nm to 480 nm.

4. The method of claim 3, wherein the UV radiation is performed at intensity in the range of from 0.5 to 20.0 J/cm.

5. The method of claim 2, wherein a solution comprises including 70%-80% functional group monomers and functionalized monomers, 20%-30% ketone-type or alcohol-type solvents and 1-6% photoinitiators.

6. The method of claim 1, wherein applying the protective coating comprises applying a protective solution to a thickness of from 15 to 25 microns.

7. A method of manufacturing a touch screen, comprising:
    fabricating a touch sensor by:
        applying the catalytic photoresist composition onto a transparent substrate;
        photo patterning the catalytic photoresist composition to have a layer of catalytic photoresist pattern;
        plating a metal layer on the layer of catalytic photoresist pattern thereby forming a metallic micro-mesh;
        applying a metal passivation layer over the metal layer;
        applying a clear protective coating comprising mono or multifunctional acrylic monomers or oligomers over the metal passivation layer; and
        curing the protective coating to generate cross-linked three-dimensional polymer structure; and,
    attaching the touch sensor to a front surface of a display screen.

8. The method of claim 7, wherein attaching the touch sensor to the front surface of a display screen comprises applying an optically clear adhesive to a thickness of from 5 to 40 microns.

9. The method of claim 8, wherein the transparent substrate comprises polyethylene terephthalate having a thickness of from 30 to 50 microns.

10. A conductive mesh touch sensor comprising:
    a transparent substrate;
    a layer of catalytic photoresist patterns made of a catalytic photoresist composition, the catalytic photoresist composition including a photoresist and catalytic nanoparticles;
    a metal conductive layer with conductive patterns forming a conductive mesh over the layer of catalytic photoresist patterns;
    a metal passivation layer over the metal layer; and a clear protective coating having a cross-linked structure and formed over the metal passivation layer.

11. The touch sensor of claim 10, wherein the metal conductive layer includes copper and the metal passivation layer includes palladium.

12. The touch sensor of claim 11, wherein the clear protective coating comprises monomers that reacted simultaneously at different joint points to create a cross linked, three-dimensional polymer structure.

13. The touch sensor of claim 12, wherein the clear protective coating covers the conductive mash and excludes a bond pad area of the touch sensor.

14. The touch sensor of claim 11, wherein the clear protective coating has a thickness of from 25 to 50 micrometers.

15. The touch sensor of claim 14, wherein the transparent substrate comprises polyethylene terephthalate having a thickness of from 30 to 50 microns.

16. A touchscreen, comprising:
a display device;
a touch sensor over the display device; and,
an optically clear adhesive between the display device and the touch sensor;
wherein the touch sensor comprises: a transparent substrate; a layer of catalytic photoresist patterns of a catalytic photoresist composition, the catalytic photoresist composition including a photoresist and catalytic nanoparticles; a metal conductive layer with conductive patterns over the layer of catalytic photoresist patterns; a metal passivation layer over the metal layer; and a transparent protective layer having a cross-linked structure and formed over the metal passivation layer.

17. The touchscreen of claim 16, wherein the clear protective coating includes a cross-linked structure that does not originate from a polymer chain.

18. The touchscreen of claim 17, wherein the clear protective coating comprises monomers that reacted simultaneously at different joint points to create a cross linked, three-dimensional polymer structure.

19. The touchscreen of claim 18, wherein the clear protective coating comprises UV cured mono or multifunctional acrylic monomers or oligomers.

20. The touchscreen of claim 16, wherein the optically clear adhesive has a thickness of from 5 to 40 microns.

* * * * *